United States Patent
Suzuki et al.

(10) Patent No.: US 6,334,691 B1
(45) Date of Patent: Jan. 1, 2002

(54) SPREAD ILLUMINATING APPARATUS

(75) Inventors: Shingo Suzuki; Masafumi Okada; Koichi Toyoda, all of Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/525,934

(22) Filed: Mar. 15, 2000

(30) Foreign Application Priority Data

Mar. 16, 1999 (JP) .............................. 11-070063

(51) Int. Cl.[7] .................................................. F21V 8/00
(52) U.S. Cl. ..................... 362/31; 362/551; 362/559; 362/558
(58) Field of Search ....................... 362/31, 26, 30, 362/339, 558, 27, 330, 331, 551, 268; 349/64, 65, 62, 57, 56

(56) References Cited

U.S. PATENT DOCUMENTS 5,608,550 A * 3/1997 Epstein ........................ 359/57
6,048,071 A * 4/2000 Sawayama ................... 362/31

FOREIGN PATENT DOCUMENTS

| JP | 402284102 | * 11/1990 |
| JP | A-10-182076 | 7/1998 |
| JP | 411282368 | * 10/1999 |

* cited by examiner

*Primary Examiner*—Alan Cariaso
*Assistant Examiner*—Hargobind S. Sawhney
(74) *Attorney, Agent, or Firm*—Oliff & Berridge, PLC

(57) ABSTRACT

Between the transparent substrate 1 and the light conductive member 2 disposed along and close to at least one side end of the transparent substrate 1, the optical path conversion plate 6 having the prism portion is disposed. Due to this optical conversion plate 6, the light from the light conductive member 2 is directed effectively toward the transparent substrate 1.

12 Claims, 9 Drawing Sheets

F I G. 5
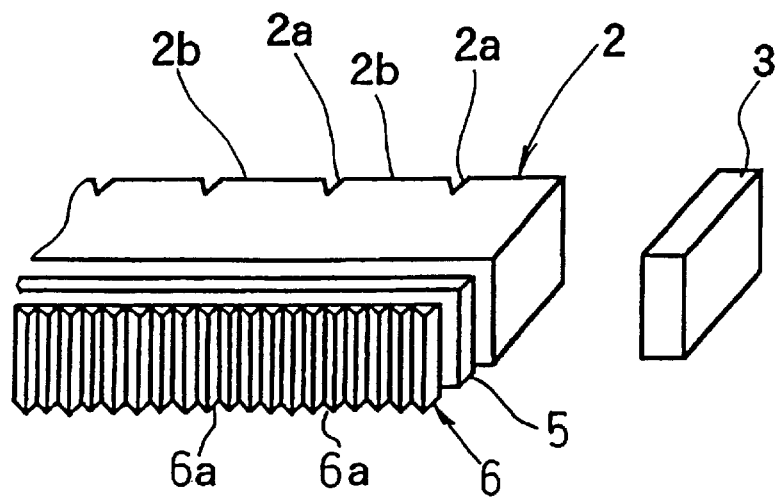
F I G. 6
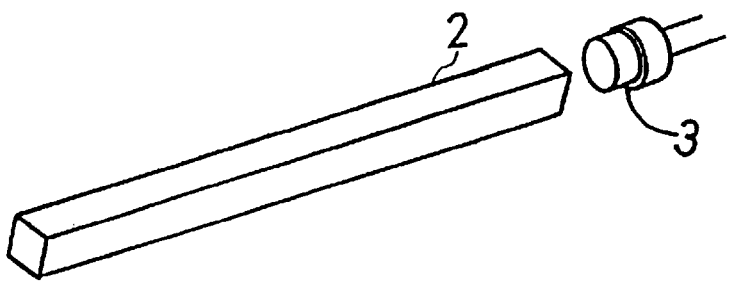
F I G. 7
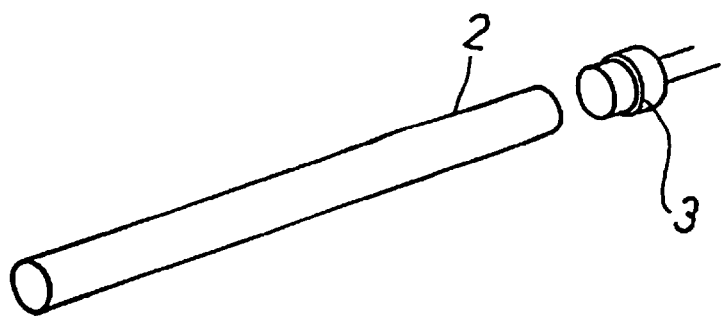

F I G .17
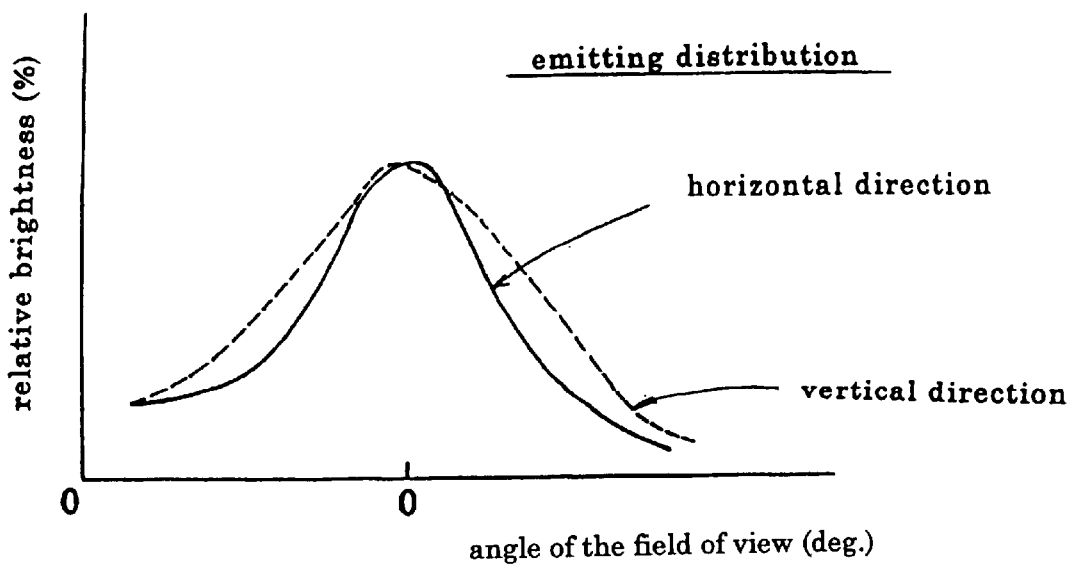
F I G .18
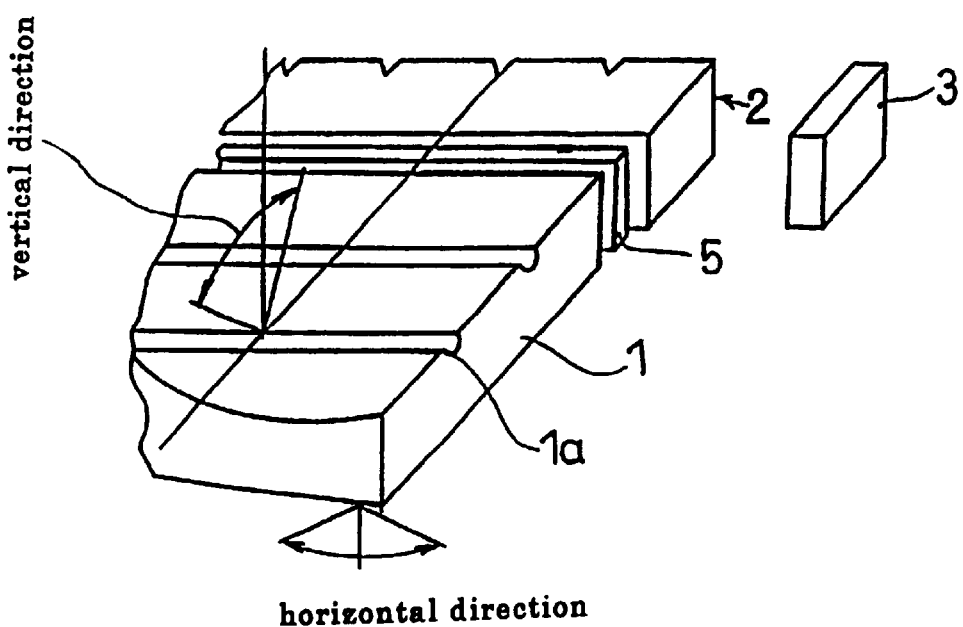

SPREAD ILLUMINATING APPARATUS

BACKGROUND ONE THE INVENTION

1. Field of the invention

This invention relates to a spread illuminating apparatus for illuminating a display for use of a personal computer (hereinafter referred to as "person corn") etc. in particular for an illuminating means for a liquid crystal display of portable type

2. Conventional Art

A cathode ray tube (so-called a picture tube) has, hitherto, been mainly used as a display for a person com, but, since it is not only large in size and heavy in weight but also large in energy consumption, recently a liquid crystal panel has been increasingly used. Further, such panels have come into wide use for portable type of person com such as a note book type of person com and information terminal appliance.

Thus, a demand for the liquid crystal panel has been increased. Since the liquid crystal panel itself does not emit light, an illuminating apparatus is required. In particular, in the recent demand for miniaturization in thickness, there has been a tendency for making use of a thin plate-like and a side light type of spread illuminating apparatus as an illuminating means for a liquid crystal display.

Conventionally, cold cathode fluorescent lamp or a hot cathode fluorescent lamp has been used as an illuminating apparatus. However, in either case, since it is a fluorescent lamp and needs a high voltage for discharging between electrodes, an energy consumption is large. In particular, if it is a portable type, when energy consumption for illuminating apparatus is large, most of the power generated from a battery is to be consumed in this illuminating apparatus.

Therefore, an apparatus which uses a white emitting diode in place of any fluorescent lamp has been developed and the present inventor has filed it as a patent application (see Japanese patent application No. Hei 10-182076). One example of this type is explained based on FIG. 12. A transparent substrate 1 as a spread body is of thin plate, on one end of which a bar-like light conductive member 2 is disposed. And, one portion of the light conductive member 2 is provided with an optical path conversion means.

A light emitting diode (LED) 3 as a light emitting body is disposed on at least one end of the light conductive member 2. The color of the light emitted by the light emitting diode 3 is white, and when necessary, the light emitting diode 3 is surrounded with a case having a reflection function in order to make most of the emitting light incident on the light conductive member 2 when the light emitting diode 3 emits the light with electric current on. In this structure, when the light emitting diode 3 emits light, the light is directed through the light conductive member 2 toward the transparent substrate 1, and the light emitted from the transparent substrate 1 illuminates a liquid crystal panel 4.

Thus, the light conductive member 2 carries out the function of directing the light emitted from the light emitting diode 3 toward the transparent substrate 1 by converting the optical path by 90 degrees.

And, in order to carry out the conversion satisfactorily, a light reflection pattern which is formed by a plurality of grooves 2a triangular in section disposed at a regular spacing is provided on one end of the surface of the light conductive member 2. A plane portion 2b is formed between grooves 2a.

In this structure, the light emitted from the light emitting diode 3 enters the light conductive member 2 through the end face thereof and meets the grooves 2a of the light reflection pattern, then travels from the light conductive member 2 toward the transparent substrate 1.

Further, between the transparent substrate 1 and the light conductive member 2, a light diffusion plate 5 is provided. The light diffusion plate 5 is provided to eliminate a bright and dark stripe, which is caused by that only the grooves 2a are brightened rendering the grooves 2a bright and the plane portions 2b dark, and which appears on the transparent substrate 1. During travelling through the light diffusion plate 5, the light is diffused to illuminate the panel uniformly For reference, an emitting light distribution of a spot-like light source such as a light emitting diode shows a characteristic having a specific emitting distribution as shown in FIG. 13 indicating a relative light intensity on the axis of ordinates. The emitting distribution in the vertical direction from the light conductive member 2 when the light has entered the light conductive member 2 as shown in Fig. 14, is not different, as shown in FIG. 15, from what is characterized by FIG. 13 in which the light does not come through the light conductive member 2. In the horizontal direction, due to the grooves 2a as the light reflection pattern as shown in Fig. 14, the emitting distribution is given as shown in FIG. 15.

Further, by disposing a light diffusion plate 5 as shown in FIG. 16, the emitting distribution is adapted to be spread both in vertical and horizontal directions as shown in FIG. 17. When it is disposed close to the transparent substrate 1 as shown in FIG. 18, the emitting distribution is controlled in the vertical direction by the light reflection pattern 1a formed on the transparent substrate 1, but is not changed in the horizontal direction as shown in FIG. 19.

By the way, in the spread illuminating apparatus as an illuminating means of the liquid crystal display apparatus mentioned above, there are following problems. The light of the portion of a large angle of the field of view as shown in FIG. 19 is out of the range of vision, and is not utilized. The present invention has been made in this point, that is, in the spread illuminating apparatus, in which a bar-like light source is disposed near the side surface of the transparent substrate 1 made of light-permeable materials, the unused light out of the range of vision is collected within the range of vision as an effective light to increase brightness in the illuminating apparatus.

According to a first aspect of the present invention in order to solve the above problem, in a spread illuminating apparatus in which a bar-like light source is disposed nearby the side of a transparent substrate 1 made of light-permeable materials, an optical path conversion plate comprising a group of prisms is disposed between a transparent substrate and a bar-like light source disposed along and close to at least one of the side end faces of the transparent substrate.

Further, according to a second aspect of the present invention, in the spread illuminating apparatus of the first aspect, the bar-like light source comprises a light conductive member made of light-permeable materials and a spot-like light source disposed on at least one end of the light conductive member.

Further, according to a third aspect of the present invention, in the first aspect, a diffusion plate is disposed between the bar-like light source and the optical path plate comprising a group of prisms.

Further, according to a fourth aspect of the present invention, in the first aspect, a prism row of the optical path conversion plate with a group of prisms is disposed parallel to the longitudinal direction of the light conductive member.

Further, according to a fifth aspect of the present invention, in the first aspect, a prism row of the optical path conversion plate with a group of prisms is disposed perpendicular to the longitudinal direction of the light conductive member.

Further, according to a sixth aspect of the present invention, in the first aspect, the light conductive member is rectangular in section.

Further, according to a seventh aspect of the present invention, in the first aspect, the light conductive member is circular in section.

Further, according to a eighth aspect of the present invention, in the first aspect, the sectional area of the light conductive member becomes smaller as getting far from the spot-like light source.

Further according to a ninth aspect of the present invention, in any one of the first to eighth aspects, the light conductive member is provided with an optical path conversion means.

Further, according to a tenth aspect of the present invention, in any one of the first to eighth aspects, the optical path conversion means of the light conductive member is formed with light reflection portions formed with grooves and plane portions.

Further, according to an eleventh aspect of the present invention, in any one of the first to eighth aspects, the optical path conversion means of the light conductive member is formed by continuously providing inclined surfaces substantially triangular in section.

Further, according to a twelfth aspect of the present invention, in any one of the first to eighth aspects, the optical path conversion means of the light conductive member is formed with both light dispersive-transmissive and light dispersive-reflective portions with finely rugged surfaces and plane portions.

Further, according to a thirteenth aspect of the present invention, in any one of the first to eighth aspects, the optical path conversion means of the light conductive member is formed with light dispersive-reflective portions partially coated with white or opaline paint.

Further, according to a fourteenth aspect of the present invention, in any one of the first to thirteenth aspects, a surface formed with the optical path conversion means of the light conductive member is covered with a light reflection member.

By constitution as mentioned above, an optical path of the light from the light source formed with a light conductive member and a spotlike light source is changed by the optical path conversion plate comprising a group of prisms, the efficiency of the light emitting distribution emitted from the transparent substrate increases, and the liquid crystal panel is illuminated with higher brightness.

BRIEF DESCRIPTION OF THE DRAWINGS

FIG. 5 is a perspective view of an variation from FIG. 1.

FIG. 6 is a perspective view showing the light conductive member and the light source portion.

FIG. 7 is a perspective view showing a variation from FIG. 6.

FIG. 17 is a graph showing the light emitting distribution of FIG. 16.

FIG. 18 is a perspective view of the diffusion plate provided close to the transparent substrate.

EMBODIMENT

Figure 1:
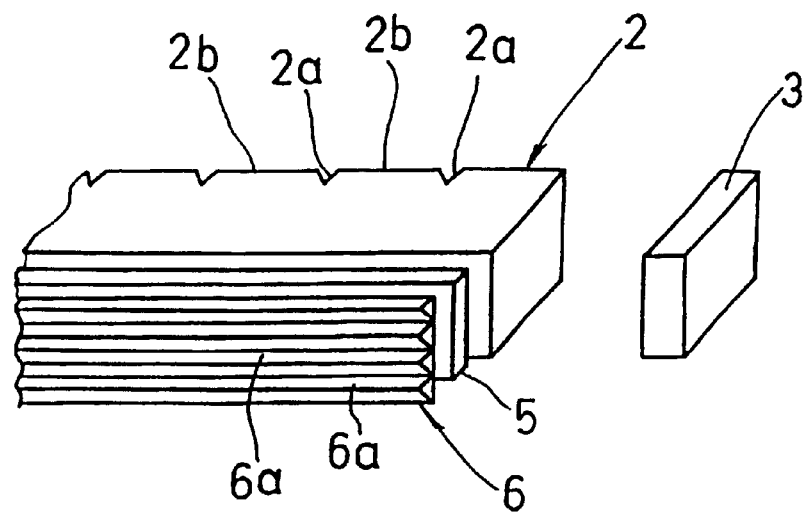
FIG. 1 is a perspective view showing the gist of an embodiment of the present invention.
Figure 2:
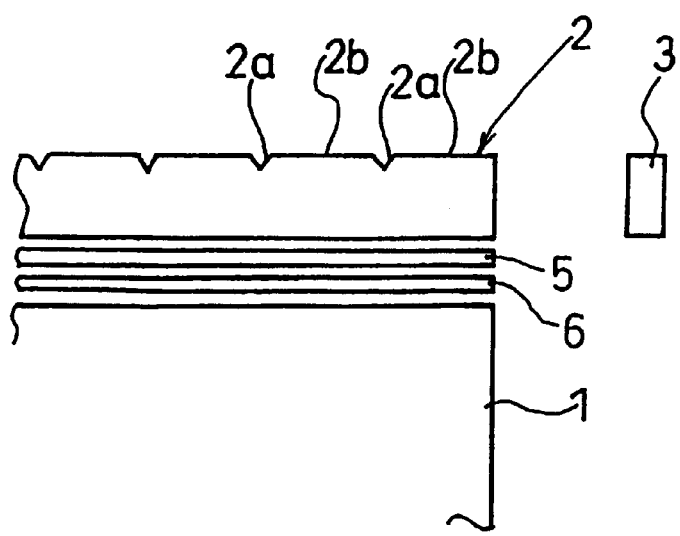
FIG. 2 is a top view of FIG. 1.
Figure 16:
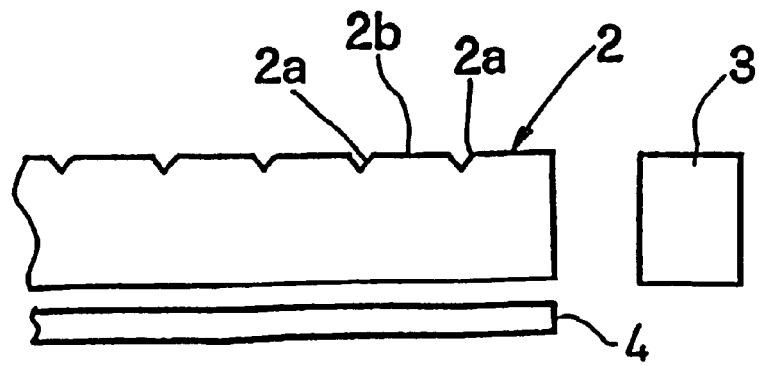
FIG. 16 is a plan view showing the diffusion plate set in front of the light conductive member.
Figure 19:
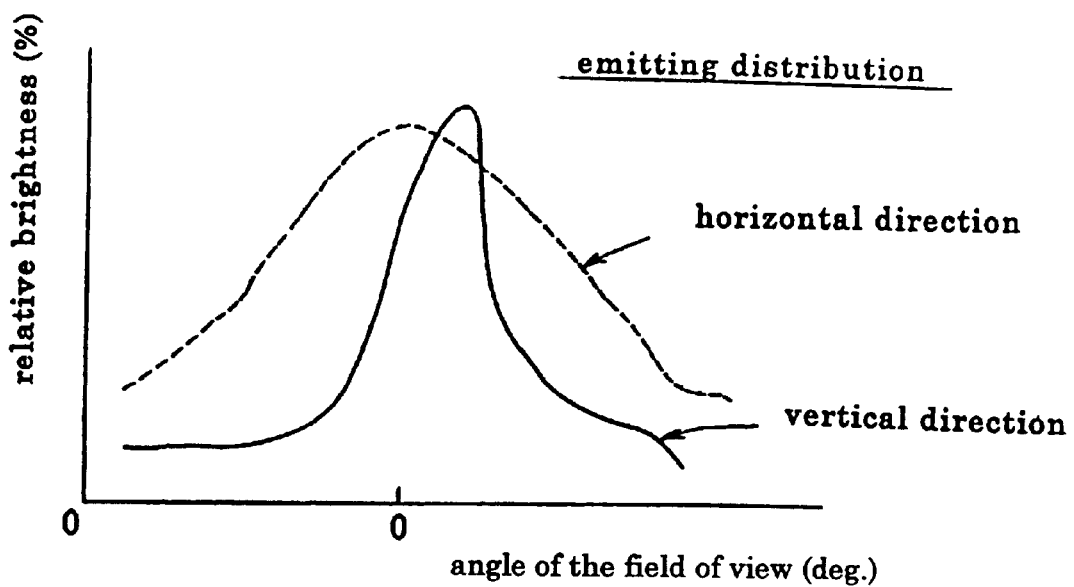
FIG. 19 is a graph indicating the light emitting distribution of FIG. 18.

Hereinafter, one embodiment of the present invention is explained referring to FIG. 1 showing a perspective view without the transparent substrate 1 and FIG. 2 showing a top view including the transparent substrate 1. The difference of the present invention from what are shown in FIGS. 16 and 18 resides in the provision of an optical path conversion plate 6 between the light diffusion plate 5 and the transparent substrate 1. This optical path conversion plate 6 comprises a group of prisms, through which an optical path of the light diffused by the diffusion plate 5 is converted.

Figure 3:
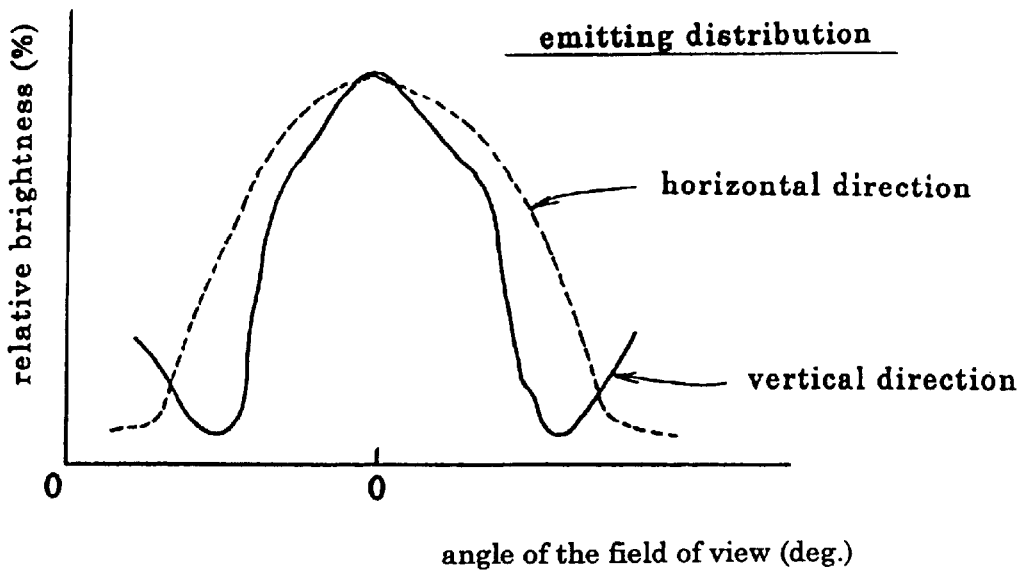
FIG. 3 is a graph showing the light emitting distribution of FIG. 1.
Figure 4:
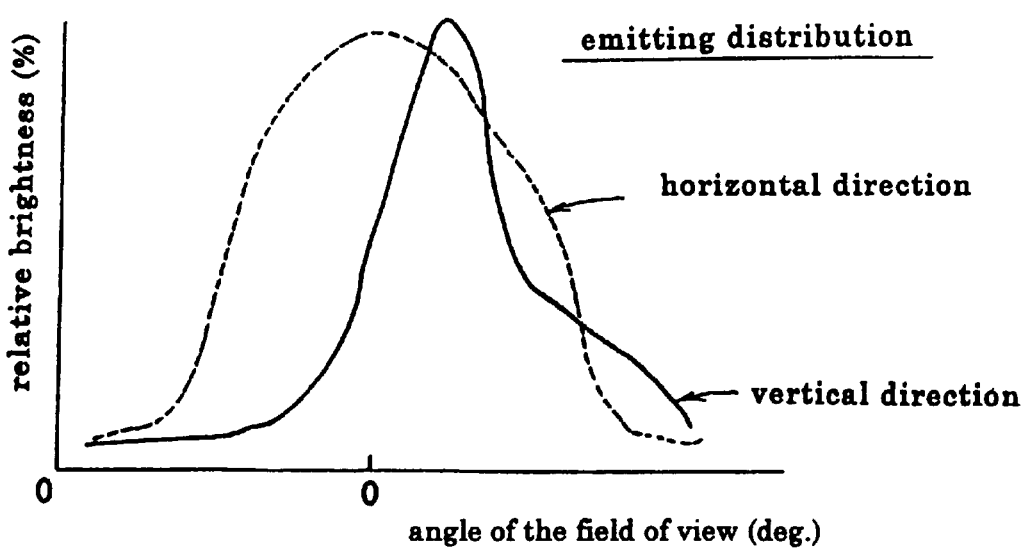
FIG. 4 is a graph showing the light emitting distribution from the transparent substrate when light enters the transparent substrate in FIG. 1.
Figure 8:
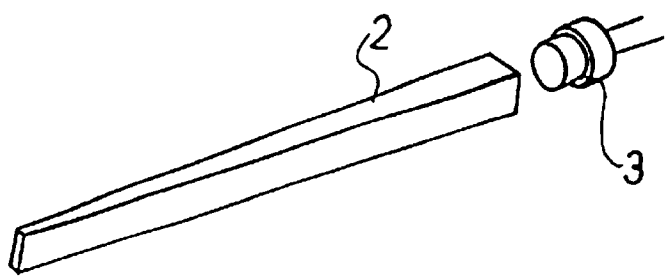
FIG. 8 is a perspective view showing another variation from FIG. 6.

The light emitting distribution, when the optical path conversion plate 6 comprising a group of prisms is disposed in front of the light conductive member 2 and the diffusion plate 5, is given as shown in FIG. 3. When the light having the above emitting distribution enters the transparent substrate 1, the light emitting distribution is given as shown in FIG. 4. By making use of the light effectively which exists out of the range of vision, the liquid crystal panel 4 is illuminated in a high brightness by the light emitted from the transparent substrate 1.

A prism row 6a of the group of the prisms of the optical path conversion plate 6 shown in FIG. 1 is disposed in parallel to the longitudinal direction of the light conductive member 2, but it is not limited to this and may be disposed perpendicular to the longitudinal direction of the light conductive member 2, as shown in FIG. 5.

Although the light conductive member 2 as explained above is rectangular in longitudinal section as shown in FIG. 6 it is not limited to this and may be, as shown in FIG. 7, circular in longitudinal section (accordingly cylindrical as a whole) and also may be formed as a wedge-shape in such a manner as the cross section area becomes smaller as getting far from the spot-like light source.

Figure 9:
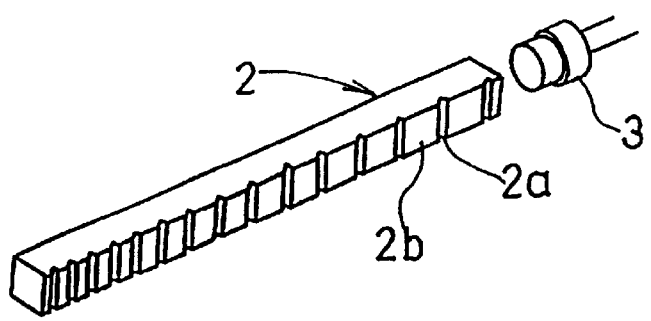
FIG. 9 is a perspective view showing the optical path conversion means of the light conductive member.
Figure 10:
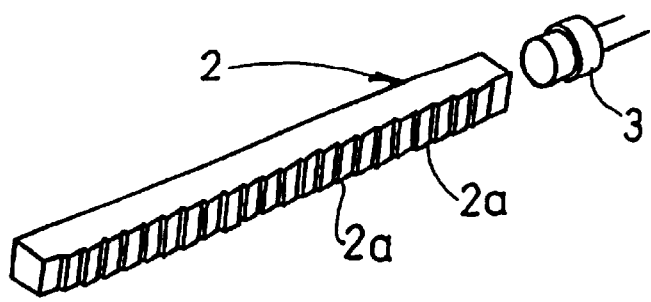
FIG. 10 is a perspective view showing a variation from FIG. 9.

FIGS. 9 and 10 show the grooves 2a of a light reflection pattern to be provided as an optical path conversion means on the back side (upper side in FIGS. 1 and 5) of the light conductive member 2, and the plane portions 2b formed between the grooves 2a. In this case, the grooves 2a reflect and transmit the light. FIG. 9 shows the spacing between the grooves 2a and the spacing is adapted to become smaller as it gets away from the light emitting diode 3, while FIG. 10 shows the spacing is uniform with the grooves 2a as a whole configured like saw teeth. The configurations of these grooves 2a can be appropriately settled in such a manner as light can be emitted uniformly in consideration of the length (distance) of the light conductive member 2.

The above example shows a light reflection pattern is formed by providing the grooves 2a on the back side of the light conductive member 2, and the light emitted from the light emitting diode 3 enters the light conductive member 2 at the end face thereof, travels and emits light while repeating reflection and refraction through the light reflection pattern and then proceeds toward the transparent substrate 1. But, it is also practicable to form light diffusive-reflective portions, without providing grooves as light reflection pattern, by partly applying white or opaline paint to portions of the light conductive member 2 where grooves are supposed to be provided.

Figure 11:
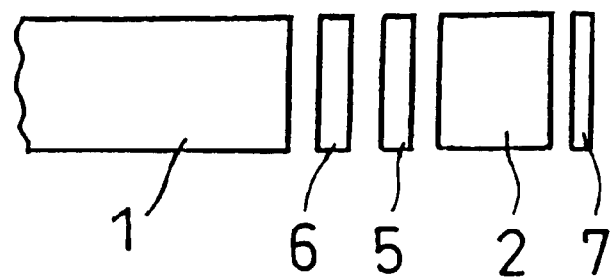
FIG. 11 is a side view showing the case in which a light reflection member is used.
Figure 12:
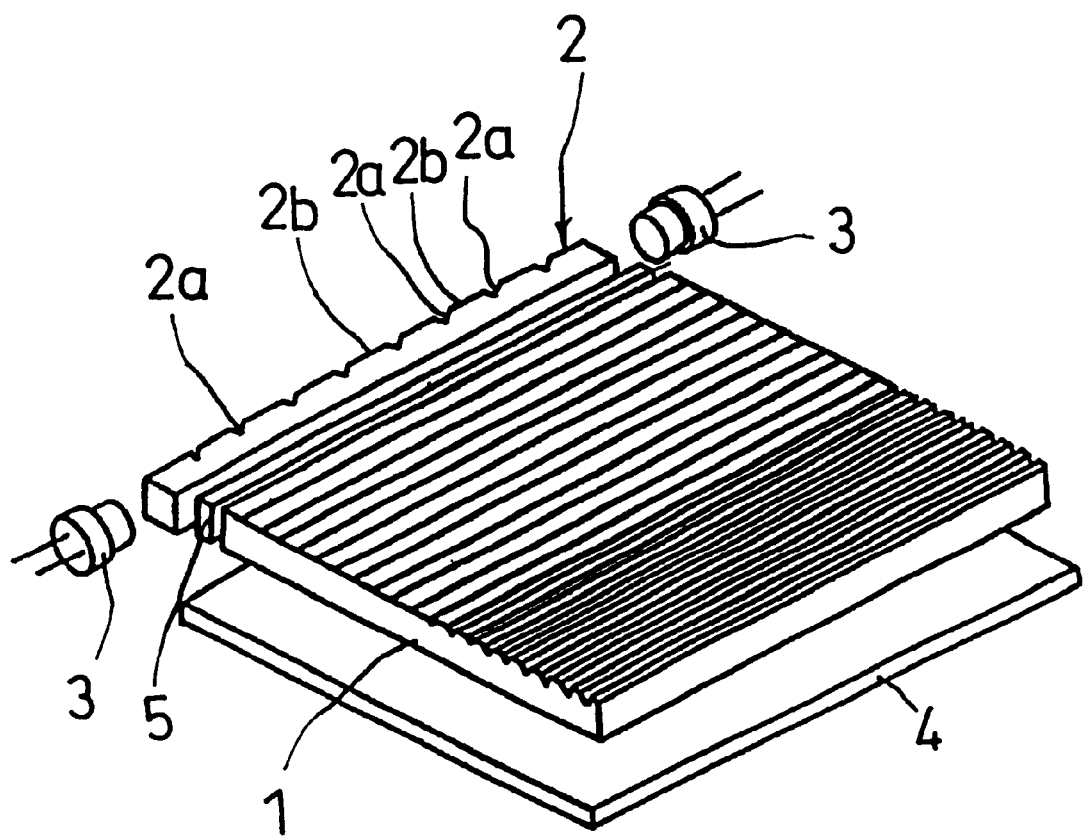
FIG. 12 is a perspective view showing whole of the spread illuminating apparatus.
Figure 13:
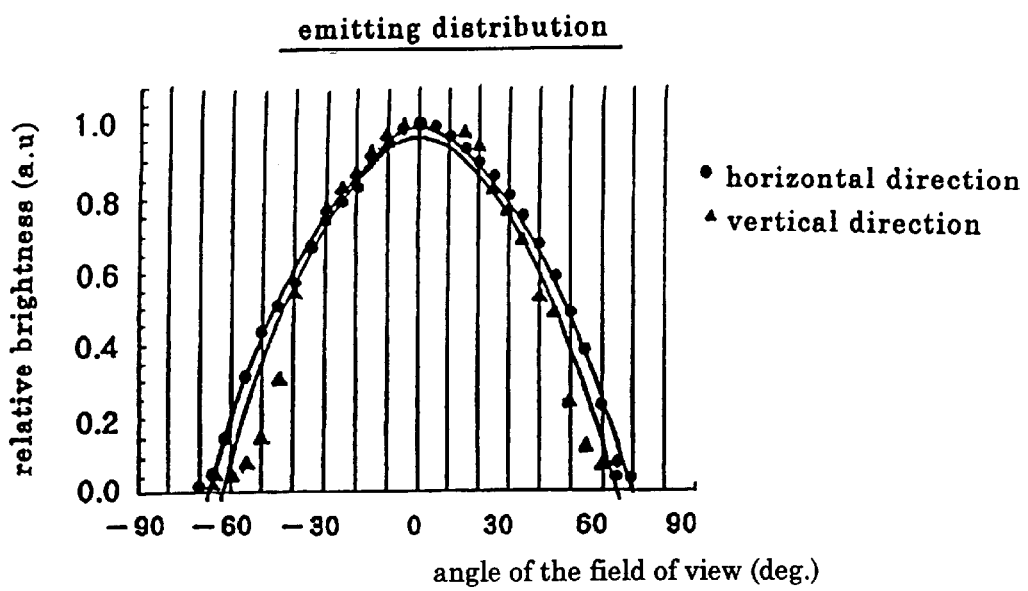
FIG. 13 is a graph indicating a relative brightness in axis of ordinates and a vision angle in axis of abscissas.
Figure 14:
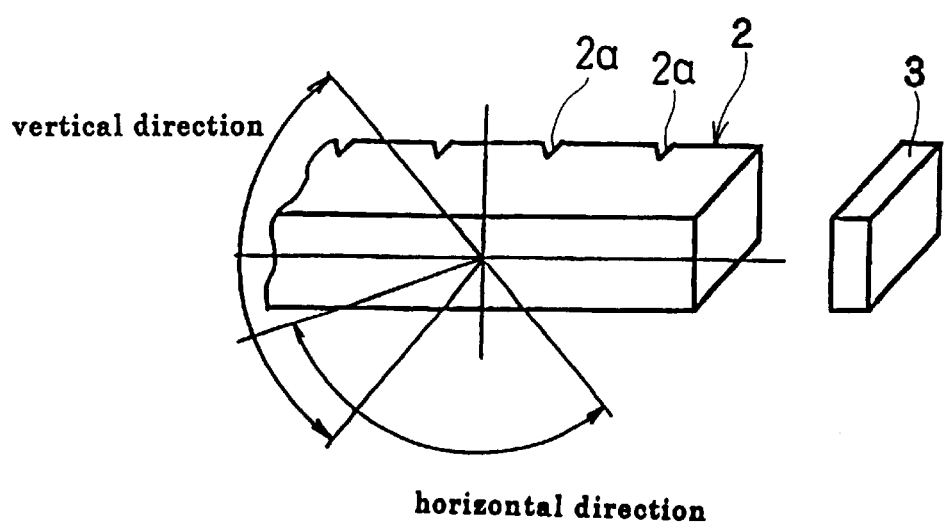
FIG. 14 is an explanation view for explaining the light emitting distribution of the light conductive member.
Figure 15:
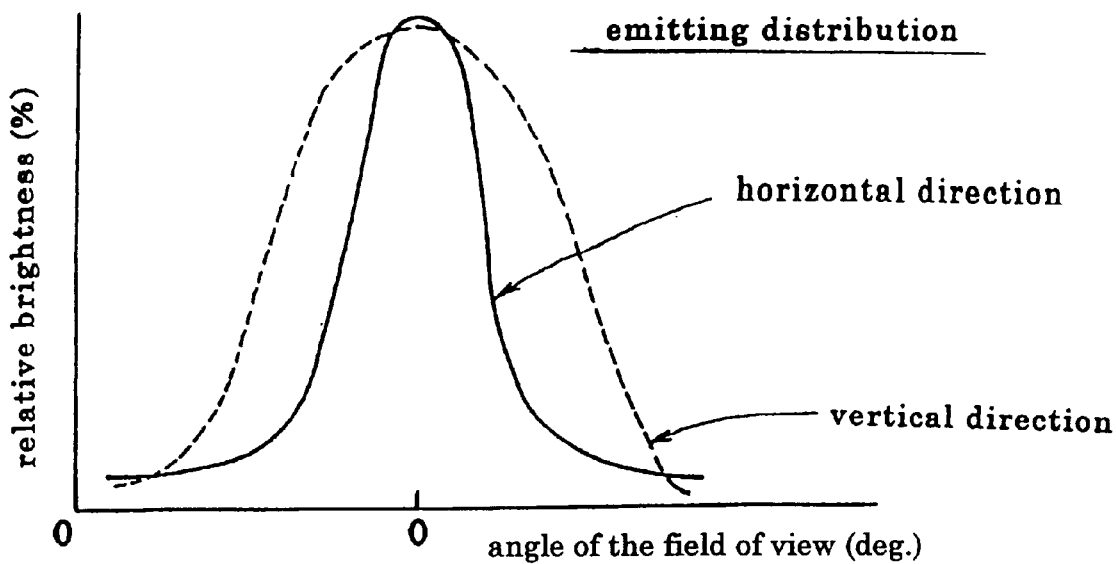
FIG. 15 is a graph indicating the light emitting distribution of FIG. 14.

FIG. 11 shows the portion where a light reflection pattern of the light conductive member 2 is formed is covered with a light reflection member 7. If covered as such, since the light leaked from the light reflection pattern can be returned, it can be forwarded toward the transparent substrate 1 effectively.

The present invention relates to a spread illuminating apparatus constituted as mentioned above, and provides a liquid crystal panel with a higher brightness by turning the ineffective light existing out of the range of vision into effective light and by efficiently controlling the light emitting distribution from the transparent substrate by means of the optical path conversion plate comprising the light conductive member and a group of prisms.

What is claimed is:

1. A spread illuminating apparatus having a transparent substrate made of light permeable materials, the transparent substrate having side end faces, the spread illuminating apparatus comprising:

a bar-like light source nearby a side of the transparent substrate, the bar-like light source formed with a light conductive member made of light permeable materials and a spot-like light source disposed on at least one of the side end faces of the light conductive member, the light conductive member provided with an optical path conversion means; and an optical path conversion plate having a group of prisms and disposed between the transparent substrate and the bar-like light source, the optical path conversion plate disposed along and close to at least one of the side end faces of the transparent substrate, such that vertexes of the group of prisms face the side end face of the transparent substrate.

2. A spread illuminating apparatus according to claim 1, wherein a diffusion plate is disposed between the bar-like light source and an optical path conversion plate having a group of prisms.

3. A spread illuminating apparatus according to claim 1, wherein a row of prisms of the optical path conversion plate having the group of prisms is disposed parallel to the longitudinal direction of the light conductive member.

4. A spread illuminating apparatus according to claim 1, wherein a row of prisms of the optical path conversion plate having the group of prisms is disposed perpendicular to the longitudinal direction of the light conductive member.

5. A spread illuminating apparatus according to claim 1, wherein a sectional configuration of the light conductive member is rectangular.

6. A spread illuminating apparatus according to claim 1, wherein a sectional configuration of the light conductive member is circular.

7. A spread illuminating apparatus according to claim 1, wherein the sectional area of the light conductive member becomes smaller as getting far from the spot-like light source.

8. A spread illuminating apparatus according to claim 1, wherein the light conductive member is comprised of light reflection portions consisting of grooves and plane portions.

9. A spread illuminating apparatus according to claim 1, wherein the optical path conversion means of the light conductive member is comprised in such a manner as inclined surfaces with sectional configuration of substantial triangle are continuously provided.

10. A spread illuminating apparatus according to claim 1, wherein the light path conversion means of the light conductive member is comprised of both light dispersive-transmissive portions and light dispersive-reflective portions consisting of finely rugged surfaces and plane portions.

11. A spread illuminating apparatus according to claim 1, wherein the optical path conversion means of the light conductive member is comprised of light dispersive-reflective portions to which white or opaline coating is partially applied.

12. A spread illuminating apparatus according to claim 1, wherein a surface formed with the optical path conversion means is covered with a light reflection member.

* * * * *